United States Patent
Hamada

(10) Patent No.: US 8,144,477 B2
(45) Date of Patent: Mar. 27, 2012

(54) ELECTRONIC DEVICE HAVING A HINGE

(75) Inventor: Tomohiro Hamada, Tachikawa (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 12/959,208

(22) Filed: Dec. 2, 2010

(65) Prior Publication Data

US 2011/0157794 A1  Jun. 30, 2011

(30) Foreign Application Priority Data

Dec. 25, 2009  (JP) ................................. 2009-294252

(51) Int. Cl.
  *H05K 5/00* (2006.01)
(52) U.S. Cl. ......................... 361/755; 361/807; 361/810
(58) Field of Classification Search .................. 361/755, 361/807, 810, 680–688; 312/223.1, 223.2
See application file for complete search history.

(56) References Cited

U.S. PATENT DOCUMENTS

| | | | |
|---|---|---|---|
| 6,389,643 B1 * | 5/2002 | Lim et al. ........................ | 16/271 |
| 6,430,039 B2 * | 8/2002 | Nakajima et al. ......... | 361/679.27 |
| 7,400,497 B2 * | 7/2008 | Zhang et al. ............. | 361/679.55 |
| 7,489,501 B2 * | 2/2009 | Hong et al. .............. | 361/679.27 |
| 7,606,023 B2 * | 10/2009 | Konno et al. ............ | 361/679.26 |
| 2005/0115025 A1 | 6/2005 | Minaguchi et al. | |
| 2007/0165386 A1 | 7/2007 | Nakatani et al. | |

FOREIGN PATENT DOCUMENTS

| | | |
|---|---|---|
| JP | H07-293093 A | 11/1995 |
| JP | 2000-204827 A | 7/2000 |
| JP | 2001-166849 | 6/2001 |
| JP | 2002-132174 | 5/2002 |
| JP | 2002-132174 A | 5/2002 |
| JP | 2003-256078 | 9/2003 |
| JP | 2005-165478 | 6/2005 |
| JP | 2007-188311 | 7/2007 |
| JP | 2008-108558 | 5/2008 |

OTHER PUBLICATIONS

Notification of Decision of Patent Grant mailed by Japan Patent Office on Feb. 22, 2011 in the corresponding Japanese patent application No. 2009-294252 in 5 pages.

* cited by examiner

*Primary Examiner* — Hung S Bui
(74) *Attorney, Agent, or Firm* — Knobbe, Martens, Olson & Bear, LLP

(57) ABSTRACT

An electronic device includes: a key input module including a plurality of keys and configured to receive a key input; a functional component including a user interface; a first unit including a first opening and a second opening, the first opening on which the key input module is placed, and the second opening being provided near the first opening and including a bottom wall portion on which the functional component is placed; a first bracket being accommodated in the first unit and including a facing surface facing the bottom wall portion; a second unit including a display device having a display screen; and a hinge including a second bracket accommodated in the second unit and connected to the facing surface with the bottom wall portion interposed therebetween.

9 Claims, 14 Drawing Sheets

ELECTRONIC DEVICE HAVING A HINGE

CROSS-REFERENCE TO THE RELATED APPLICATION(S)

The present application is based upon and claims priority from prior Japanese Patent Application No. 2009-294252, filed on Dec. 25, 2009, the entire contents of which are incorporated herein by reference.

FIELD

Embodiments described herein generally relate to an electronic device having a hinge.

BACKGROUND

An electronic device such as a notebook PC includes a hinge which connects a display unit and a main unit to each other. A publication JP-A-2002-132174 discloses an electronic device having a hinge. In this electronic device, an extended portion is provided in a hinge used for supporting the display unit. A main unit is provided with a hook-shaped temporary fixing portion. When the extended portion of the hinge is inserted into the lower side of the temporary fixing portion, the display unit is maintained in a self-standing state during a screw-fixing operation.

In recent years, there has been increasing demand for improvement of the robustness of the electronic device. In the structure disclosed in JP-A-2002-132174, the robustness of the periphery of the hook-shaped temporary fixing portion of the main unit is not considered.

BRIEF DESCRIPTION OF THE DRAWINGS

A general configuration that implements the various features of the present invention will be described with reference to the drawings. The drawings and the associated descriptions are provided to illustrate embodiments of the invention and not to limit the scope of the invention.

DETAILED DESCRIPTION

Figure 1:
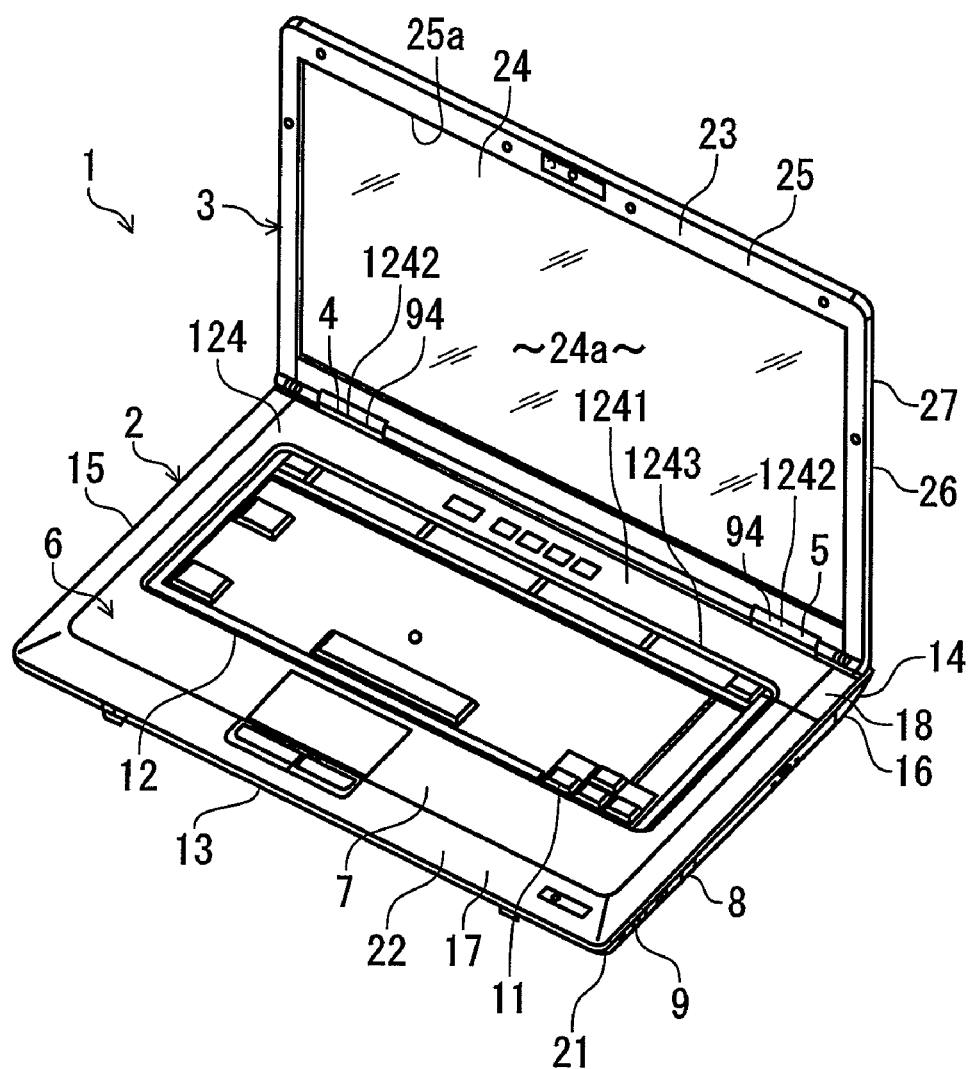
FIG. 1 is a perspective view of an electronic device according to a first embodiment of the invention.

According to the embodiments described herein, there is provided an electronic device including: a key input module including a plurality of keys and configured to receive a key input; a functional component including a user interface; a first unit including a first opening and a second opening, the first opening on which the key input module is placed, and the second opening being provided near the first opening and including a bottom wall portion on which the functional component is placed; a first bracket being accommodated in the first unit and including a facing surface facing the bottom wall portion; a second unit including a display device having a display screen; and a hinge including a second bracket accommodated in the second unit and connected to the facing surface with the bottom wall portion interposed therebetween.

Embodiments according to the present invention will be described in detail with reference to the accompanying drawings. The scope of the claimed invention should not be limited to the examples illustrated in the drawings and those described in below.

Hereinafter, a notebook-type personal computer (hereinafter, a notebook PC) according to exemplary embodiments of the invention will be described with reference to the accompanying drawings.

First Embodiment

FIGS. 1 to 13 illustrate an electronic device 1 according to a first embodiment of the invention. The electronic device 1 is, for example, a notebook PC. In addition, the electronic device according to the invention is not limited thereto. The invention may be widely applied to various electronic devices including, for example, a PDA (Personal Digital Assistant) or a portable gaming machine.

As shown in FIG. 1, the electronic device 1 includes a main unit 2, a display unit 3, and first and second hinges 4 and 5. The main unit 2 is an example of "a first unit". The display unit 3 is an example of "a second unit".

The main unit 2 is an electronic body mounted with a main board. The main unit 2 includes a body case 6. The body case 6 is an example of "a first case". The body case 6 includes an upper wall 7, a lower wall 8, and a peripheral wall 9, and is formed as a flat box shape.

When the electronic device 1 is placed on a table, the lower wall 8 faces the upper surface of the table. The lower wall 8 is substantially parallel to the upper surface of the table. The upper wall 7 is widened so as to be substantially parallel (that is, substantially horizontal) to the lower wall 8 while having a space with respect to the lower wall 8. The upper wall 7 is provided with a keyboard placement portion 12 to which a keyboard (key input module) 11 is attached.

The keyboard 11 is, for example, a type not including numeric keys. In addition, only a part of the keys of the keyboard 11 are shown in the drawing. The peripheral wall 9 is uprightly formed with respect to the lower wall 8, and connects the peripheral edge of the lower wall 8 and the peripheral edge of the upper wall 7 to each other.

As shown in FIG. 1, the peripheral wall 9 includes a front wall 13, a rear wall 14, a left side wall 15, and a right side wall 16. The front wall 13 extends in the left/right direction of a front end 17 of the main unit 2, and faces a user of the electronic device 1. The rear wall 14 extends in the left/right direction of a rear end 18 of the main unit 2 so as to be substantially parallel to the front wall 13.

The left side wall 15 and the right side wall 16 respectively extend in the front/rear direction (depth direction) of the body case 6. The left side wall 15 connects the left end of the front wall 13 and the left end of the rear wall 14 to each other. The right side wall 16 connects the right end of the front wall 13 and the right end of the rear wall 14 to each other. In addition, in the description herein, a side closer to the user is referred to as a front side, and a side farther from the user is referred to as a rear side. Further, the left/right direction is determined on the basis of the state viewed from the user.

The body case 6 includes a body base 21 and a body cover 22. The body base 21 includes a part of the lower wall 8 and the peripheral wall 9. The body cover 22 includes a part of the upper wall 7 and the peripheral wall 9. The body case 6 is formed in such a manner that the body cover 22 is combined with the body base 21.

As described above, the main unit 2 includes the rear end 18 as the first end and the front end 17 as the second end. The display unit 3 is rotatably (openably) connected to the rear end 18 by the first and second hinges 4 and 5. The display unit 3 is rotatable between a close position where the display unit falls down so as to cover the main unit 2 from the upside thereof and an open position where the display unit is raised up with respect to the main unit 2.

As shown in FIG. 1, the display unit 3 includes a display case 23 and a display device 24 which is accommodated in the display case 23. The display case 23 is an example of "a second case". The display case 23 includes a front wall 25, a rear wall 26, and a peripheral wall 27, and is formed as a flat box shape. In addition, in the description herein, the front/rear direction is determined on the basis of the posture in which the display unit 3 is raised up.

The front wall 25 faces the upper wall 7 of the main unit 2 when the display unit 3 falls down (is closed). The front wall 25 faces the user when the display unit 3 is raised up. The front wall 25 includes a comparatively large opening 25a which exposes a display screen 24a of the display device 24 to the outside.

The rear wall 26 is located on the opposite side of the front wall 25 in the display case 23. The rear wall 26 is widened so as to be substantially parallel to the front wall 25 while having a space with respect to the front wall 25. The peripheral wall 27 is uprightly formed with respect to the rear wall 26, and connects the peripheral edge of the front wall 25 and the peripheral edge of the rear wall 26 to each other.

Next, first and second hinges 4 and 5 will be described. In addition, since the configuration of the second hinge 5 is substantially the same as that of the first hinge 4, the first hinge 4 will be mainly described in detail.

Figure 2:
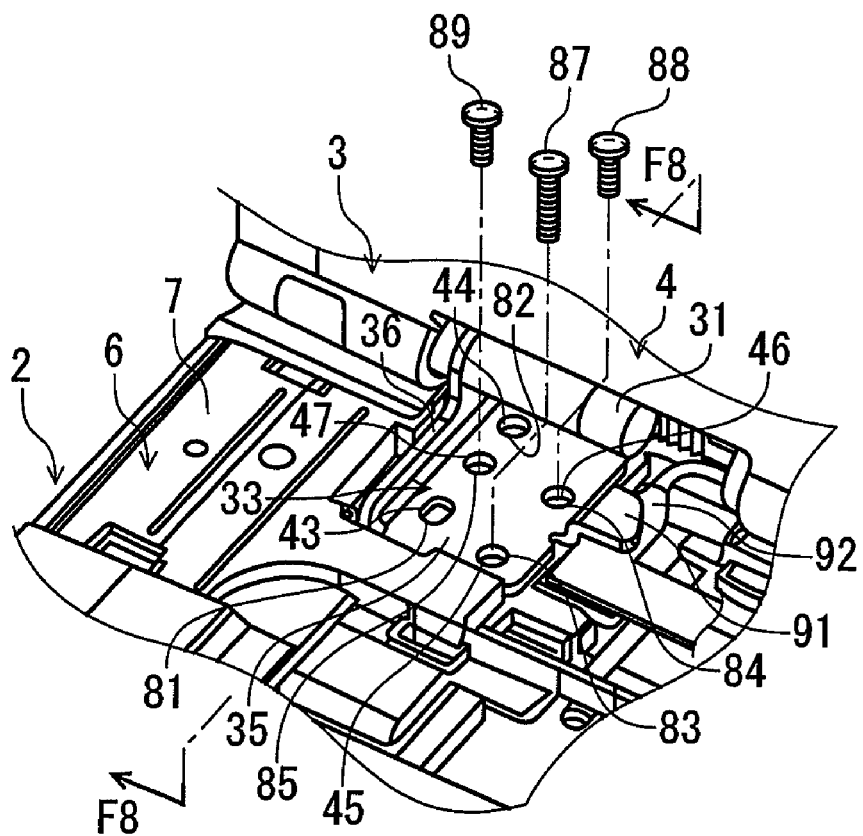
FIG. 2 is a perspective view showing an installation portion and a hinge fixing portion of the electronic device shown in FIG. 1.
Figure 3:
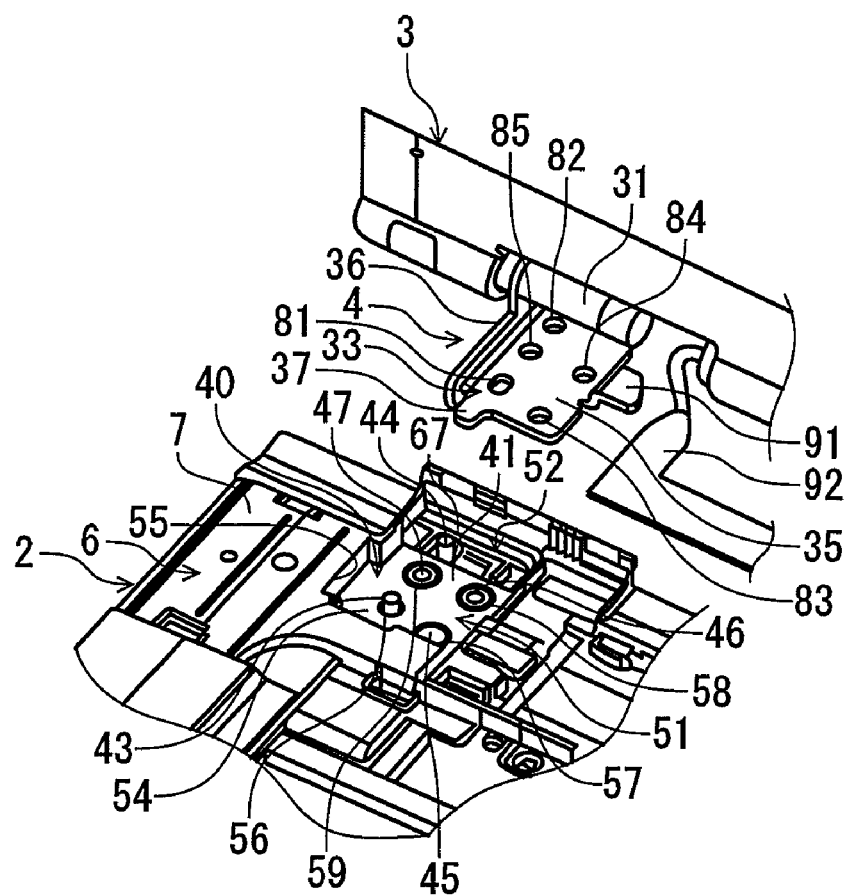
FIG. 3 is an exploded perspective view showing the installation portion and the hinge fixing portion shown in FIG. 2.
Figure 4:
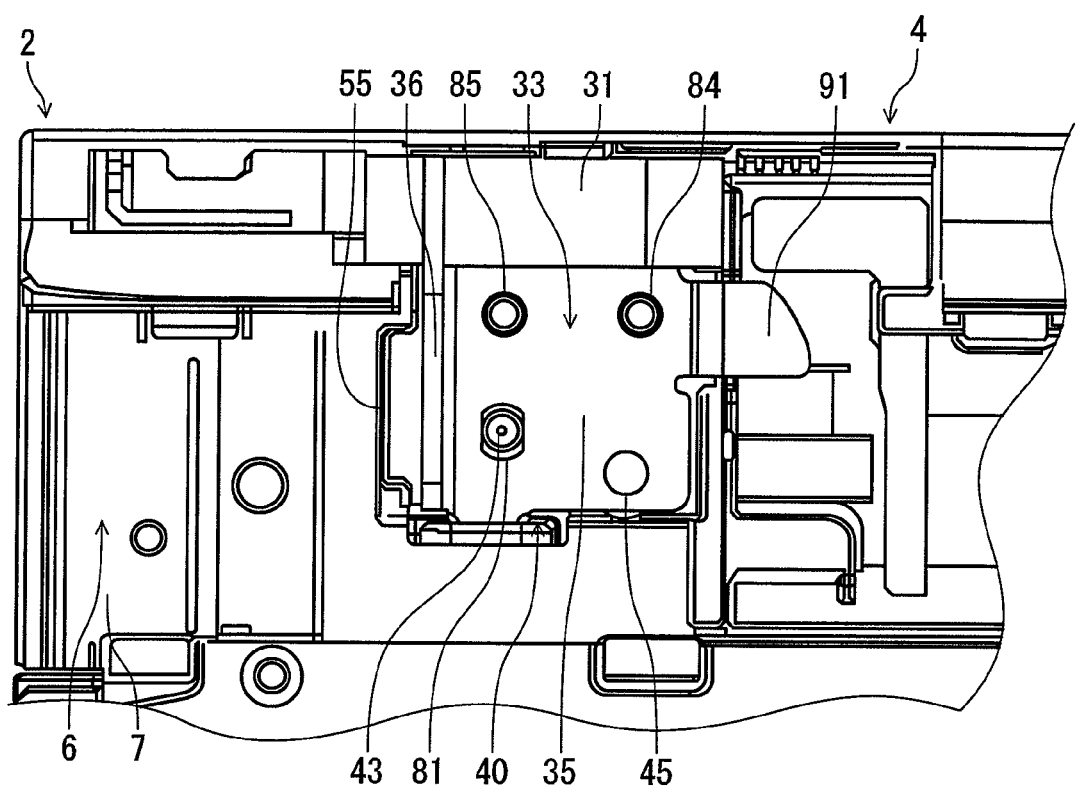
FIG. 4 is a perspective view showing the installation portion shown in FIG. 3 when seen from a different angle.

As shown in FIGS. 2 to 4, the first hinge 4 includes a hinge rotation portion 31, a hinge bracket 32, and a hinge fixing portion 33. The hinge rotation portion 31 is provided between the main unit 2 and the display unit 3. The hinge rotation portion 31 includes a hinge shaft and a cam or a disk spring attached to the hinge shaft. The hinge rotation portion 31 connects the hinge bracket 32 and the hinge fixing portion 33 so as to be rotatable relative to each other.

Figure 5:
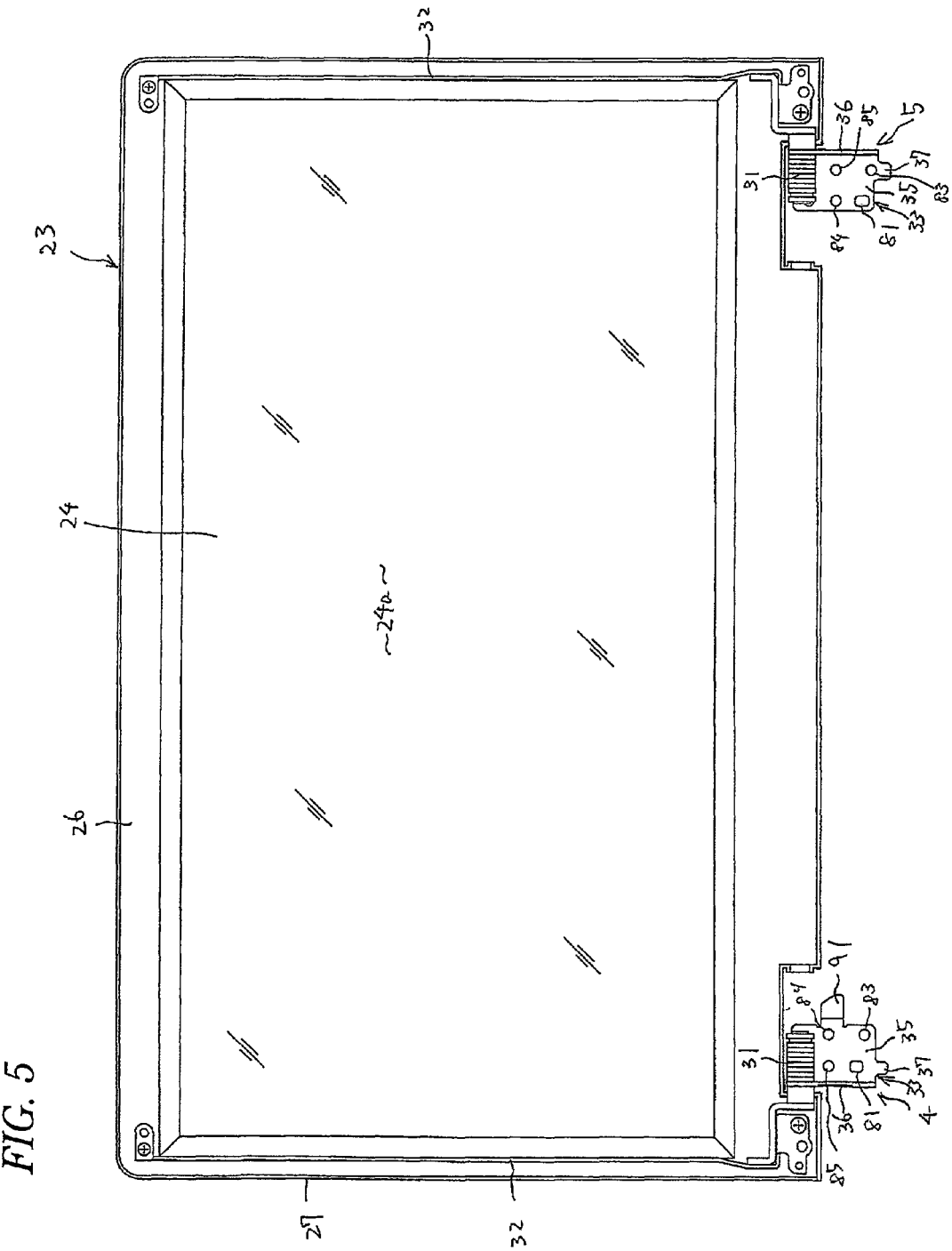
FIG. 5 is a plan view showing the inside of a display unit shown in FIG. 1.

As shown in FIG. 5, the hinge bracket 32 is connected to the hinge rotation portion 31, and extends to the inside of the display case 23. The hinge bracket 32 is formed by, for example, a sheet metal member. The hinge bracket 32 extends between the side wall of the display case 23 and the side wall of the display device 24. The hinge bracket 32 is fixed to the display case 23 through, for example, a screw fixing operation. Accordingly, the first hinge 4 is connected to the display case 23.

As shown in FIG. 2, the hinge fixing portion 33 is a portion where the first hinge 4 is fixed to the main unit 2. The hinge fixing portion 33 is an example of "a fixing portion" according to the invention. The hinge fixing portion 33 is connected to the hinge rotation portion 31. The hinge fixing portion 33 is a so-called hinge sheet metal formed by, for example, a sheet metal member.

As shown in FIG. 3, the hinge fixing portion 33 includes a main unit 35, an upright portion 36, and an insertion portion 37. The main unit 35 is formed as a horizontal plate shape. The upright portion 36 is uprightly formed from the side end of the main unit 35, so that the main unit 35 is connected to the hinge rotation portion 31. Here, the term "upright" is used in the meaning that a member is extending in a direction perpendicular to another member serving as a base plate. The insertion portion 37 protrudes from the front end of the main unit 35 in the horizontal direction. The insertion portion 37 according to the embodiment protrudes from a part of the front end of the main unit 35 so as to have a convex shape. In addition, the insertion portion 37 may be provided throughout the front end of the main unit 35. The insertion portion 37 has, for example, the same thickness as that of the main unit 35.

As shown in FIG. 3, the body case 6 is provided with an installation portion 40 to which the hinge fixing portion 33 is attached. The installation portion 40 is concave with respect to the upper wall 7 so as to have, for example, a concave shape. The installation portion 40 includes a placement surface 41, a receiving portion 42, first and second pins 43 and 44, a through hole 45, and first and second screw holes 46 and 47. The installation portion 40 is formed by, for example, a wall portion 51 and a metallic reinforcing member 52 of the body case 6 made from a synthetic resin.

Figure 6:
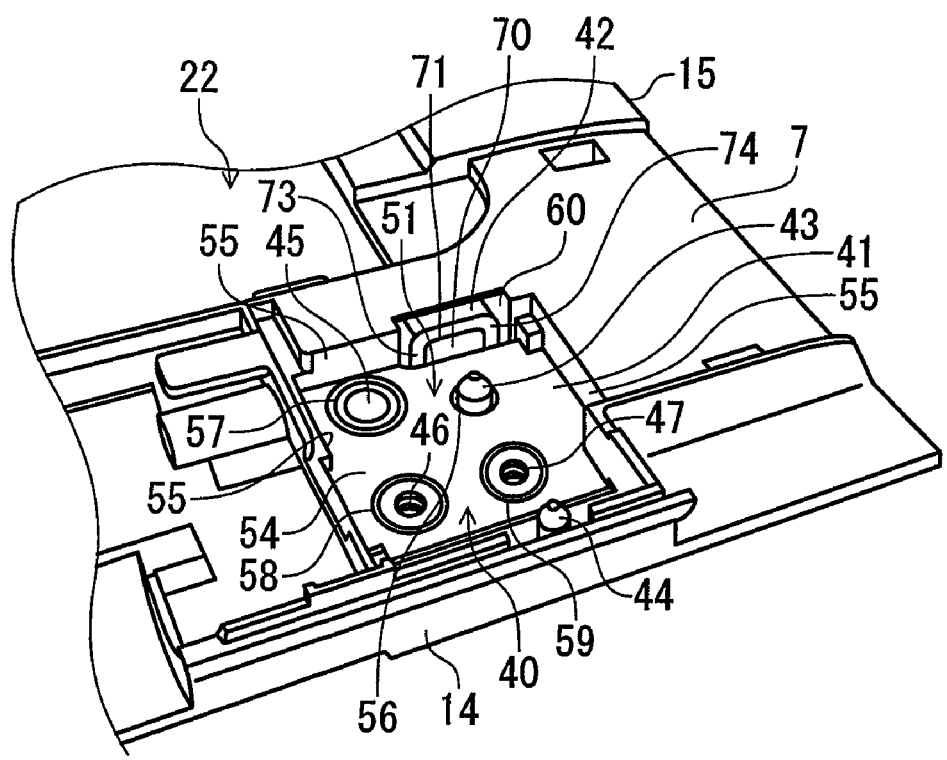
FIG. 6 is a diagram showing the installation portion shown in FIG. 3 when seen from a different angle.
Figure 11:
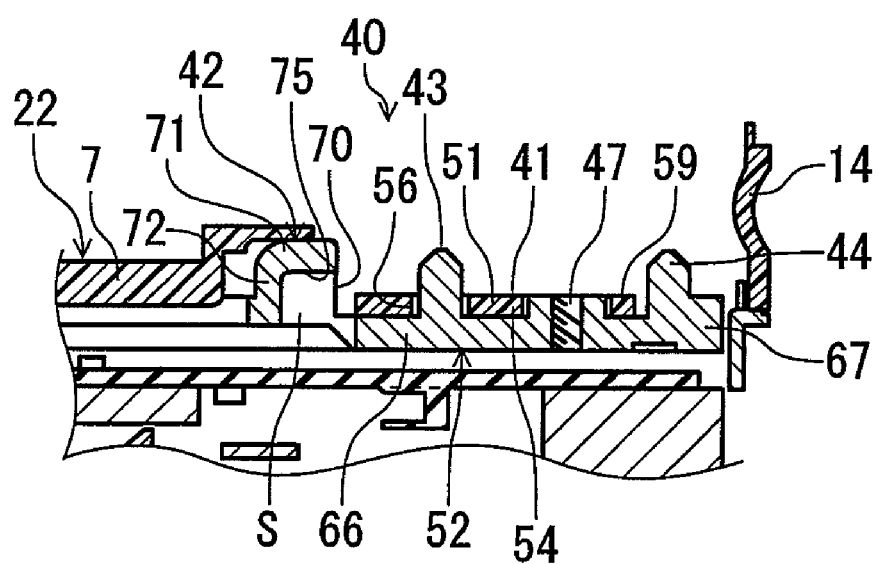
FIG. 11 is a sectional view taken along the line F8-F8 of the installation portion shown in FIG. 2.
Figure 13:
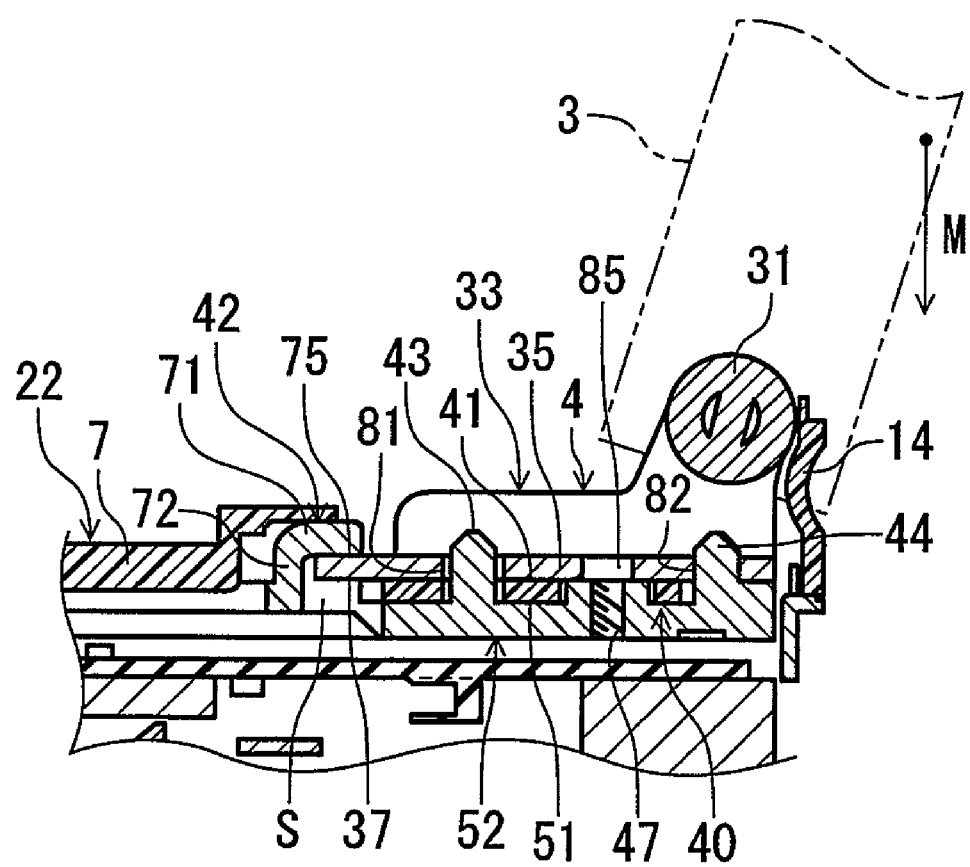
FIG. 13 is a sectional view showing a state where the hinge fixing portion is attached to the installation portion shown in FIG. 8.

As shown in FIG. 6, the wall portion 51 of the body case 6 forming the installation portion 40 is integrally formed with the upper wall 7. As shown in FIG. 11, the wall portion 51 is located above the reinforcing member 52. As shown in FIG. 13, the wall portion 51 is interposed between the reinforcing member 52 and the main unit 35 of the hinge fixing portion 33.

Figure 14:
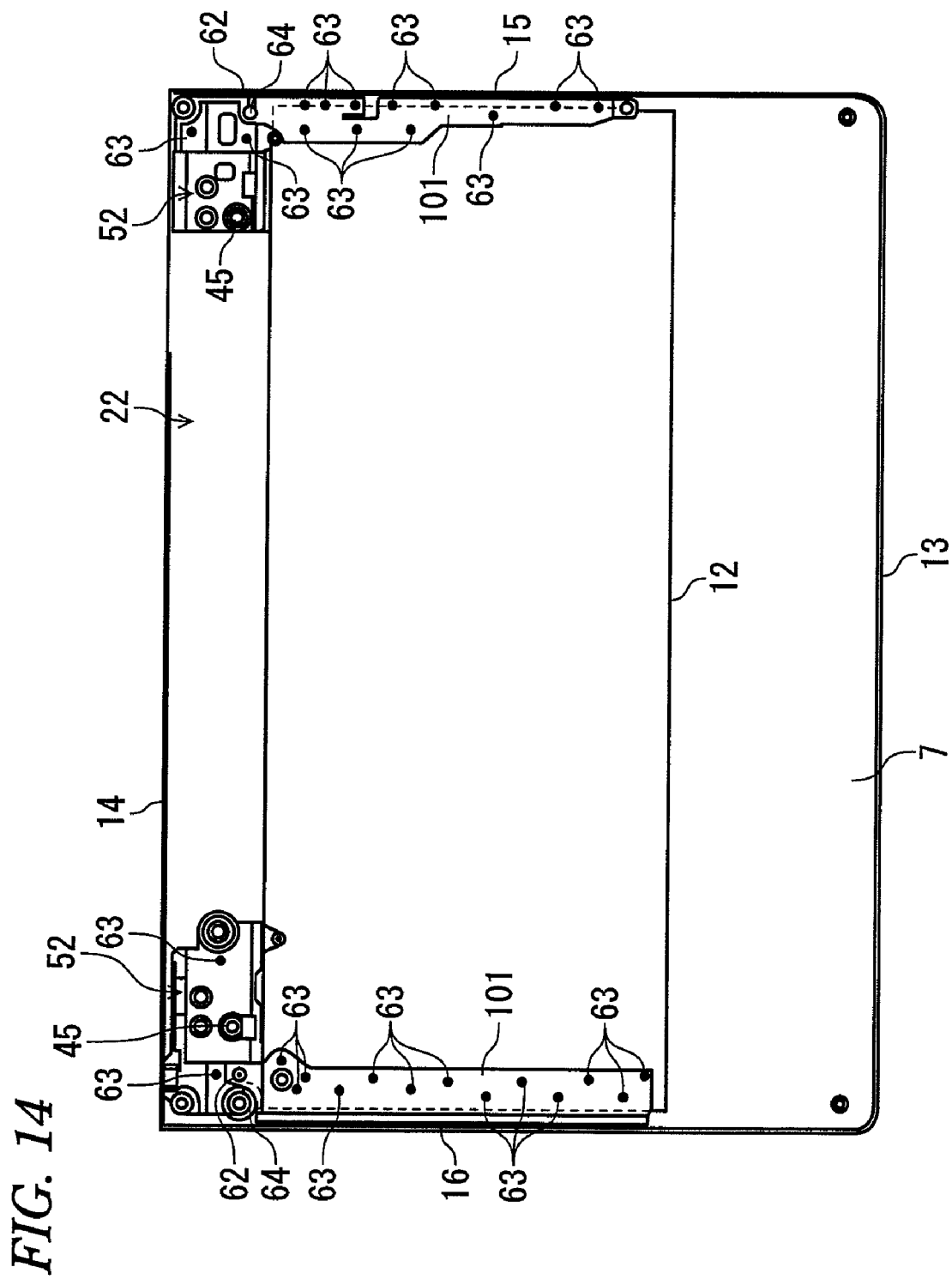
FIG. 14 is a plan view showing the inner surface of the body cover of the electronic device according to a second embodiment of the invention.

As shown in FIGS. 6, 11, and 14, the wall portion 51 includes a horizontal wall portion 54 which is widened in the horizontal direction at a position lower than the upper wall 7 and an upright wall portion 55 which is uprightly formed from the peripheral edge of the horizontal wall portion 54 and is connected to the upper wall 7. That is, the wall portion 51 has a convex shape. The horizontal wall portion 54 according to the embodiment is provided in an area more than a half of the installation portion 40, and forms a part of the placement surface 41. The hinge fixing portion 33 is placed on the horizontal wall portion 54. In addition, the horizontal wall portion 54 may be provided in an entire area of the installation portion 40 so as to form the entire part of the placement surface 41.

As shown in FIG. 6, the horizontal wall portion 54 is formed as a substantially rectangular shape. The upright wall portion 55 is uprightly formed from three peripheral edges, that is, the front edge, the left edge, and the right edge of the horizontal wall portion 54 so as to connect three peripheral edges of the horizontal wall portion 54 to the upper wall 7. Accordingly, the horizontal wall portion 54 is comparatively rigidly connected to the upper wall 7. The horizontal wall portion 54 includes a through hole 56 to which the first pin 43 is exposed, a through hole 57 to which the through hole 45 is exposed, through holes 58 and 59 to which the first and second screw holes 46 and 47 are respectively exposed, and an opening 60 to which the receiving portion 42 is exposed.

Figure 7:
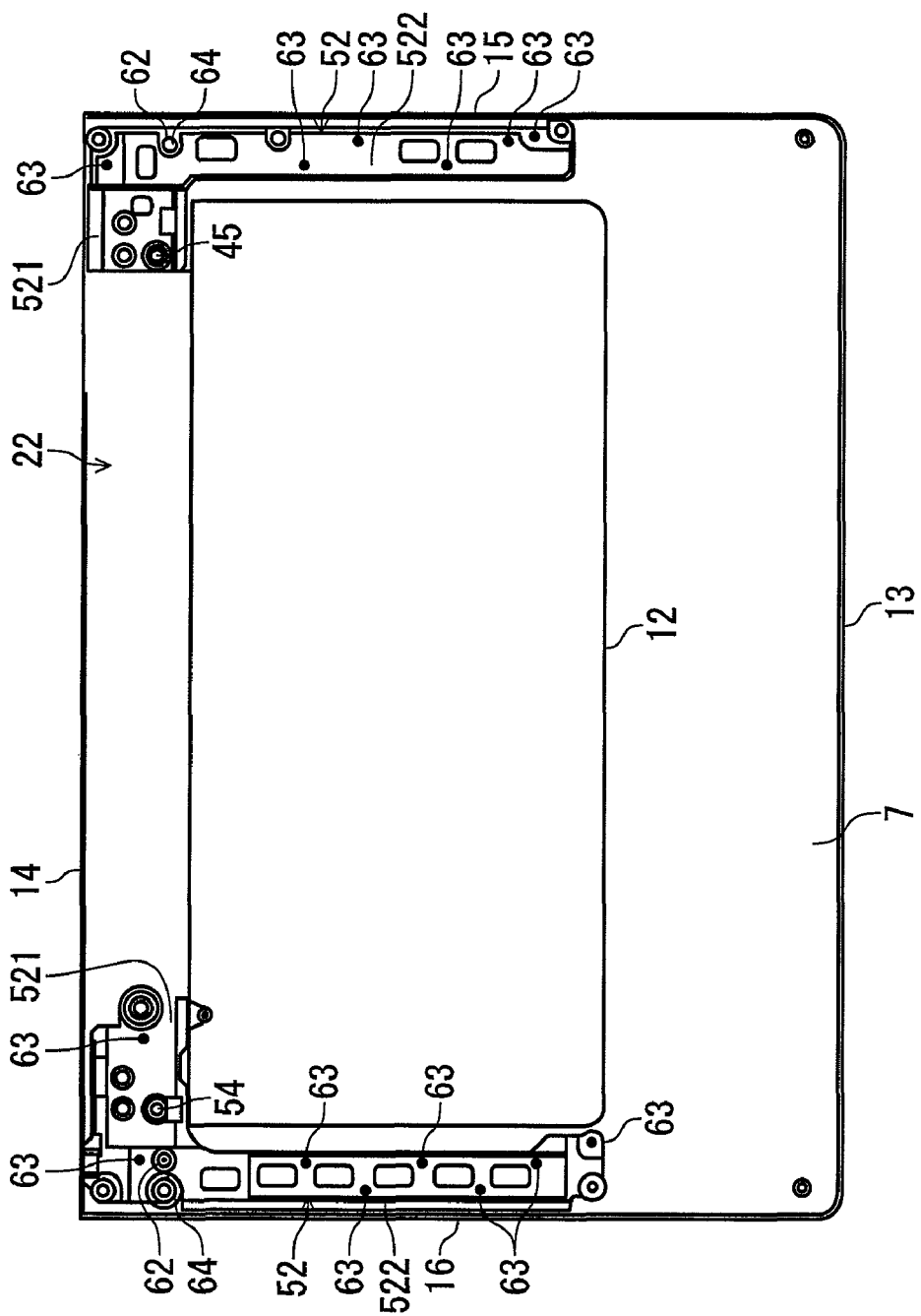
FIG. 7 is a plan view showing an inner surface of a body cover of the electronic device shown in FIG. 1.
Figure 8:
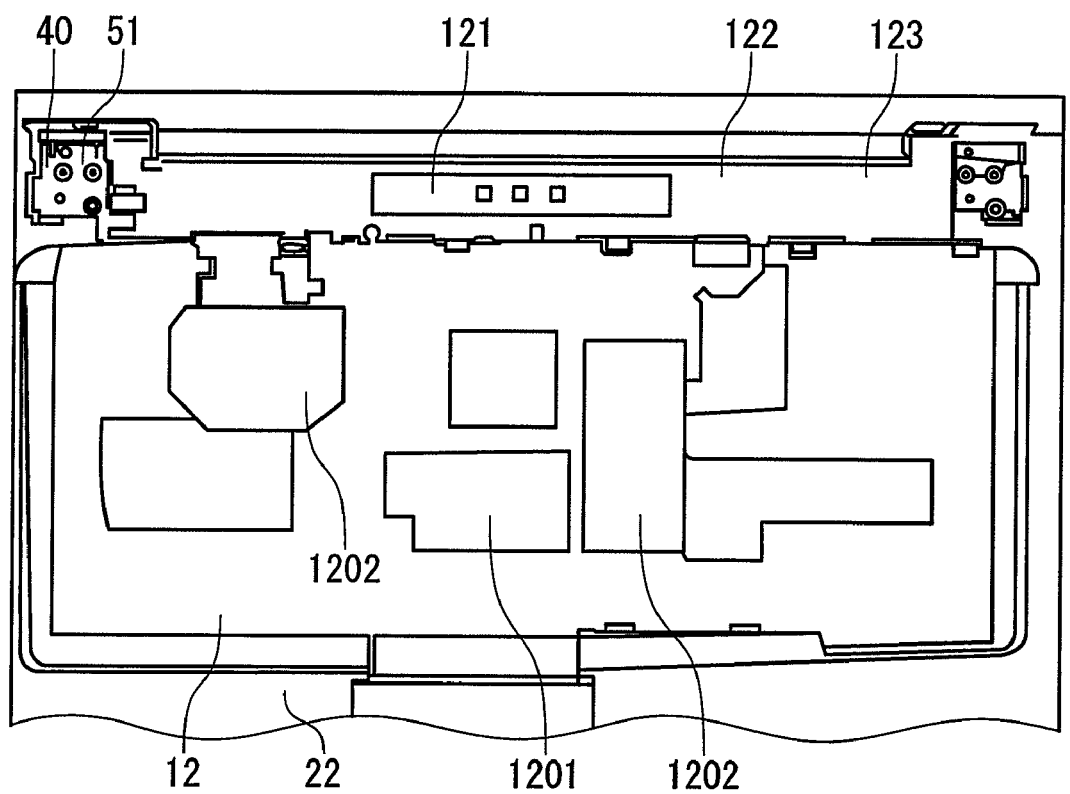
FIG. 8 is a plan view showing an upper surface of the body cover of the electronic device shown in FIG. 1.

As shown in FIGS. 7 and 8, the body cover 22 according to the embodiment is provided with the keyboard placement portion 12 and a functional component placement portion 122. The keyboard placement portion 12 is an opening which is provided in the body cover 22. The keyboard placement portion 12 is provided with an opening 1201 which allows the passage of a flexible print circuit board (not shown in the drawing) extending from the keyboard 11 and electrically connected to a circuit board (not shown in the drawing) inside the case, an opening 1202 which is used for a wiring operation performed on the circuit board after assembling the body base 21 and the body cover 22, a convex portion 1203 which improves the rigidity of the body cover 22, and the like.

Figure 12:
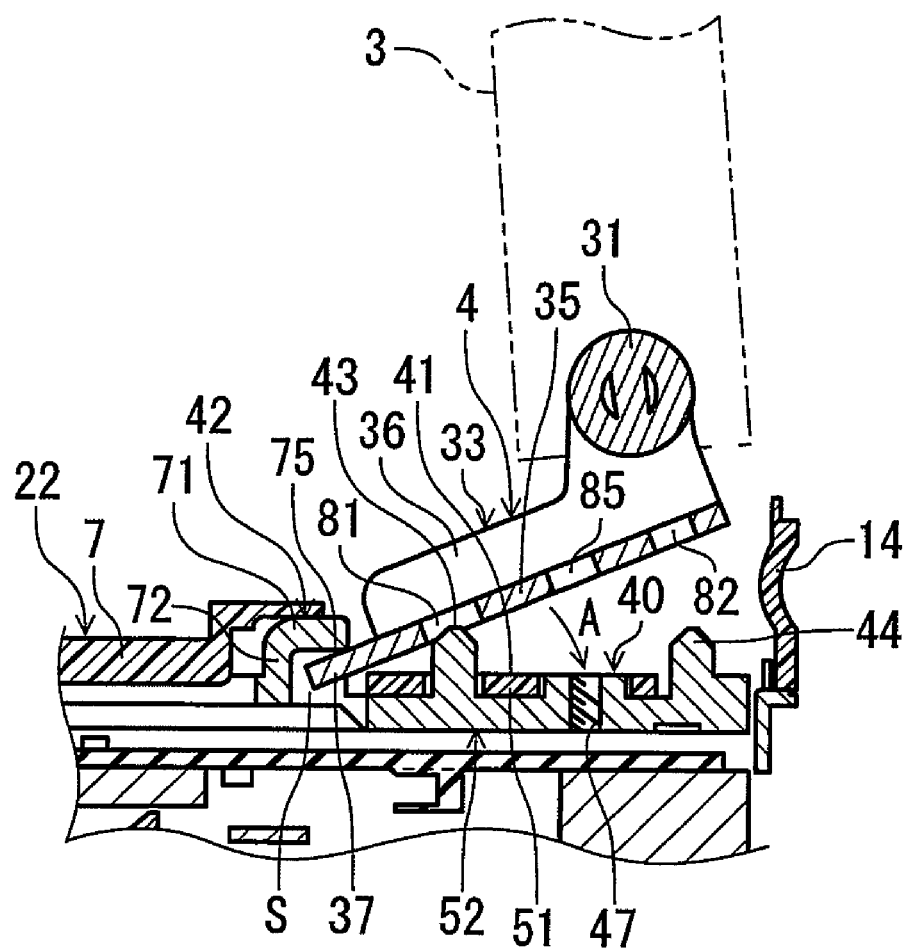
FIG. 12 is a sectional view showing a state where the hinge fixing portion is attached to the installation portion shown in FIG. 8.

The functional component placement portion 122 is provided in the vicinity of the keyboard placement portion 12 and between the keyboard placement portion 12 and the rear end 18 as the first end. The functional component placement portion 122 is mounted with, for example, functional components 121 that are provided with a user interface such as switches corresponding to various buttons such as a volume adjusting button or a power button. The functional component placement portion 122 is an opening which is provided in the periphery of the keyboard placement portion 12 and includes a bottom wall 123. In addition, as shown in FIG. 12, the wall portion 51 is provided in the bottom wall 123 of the functional component placement portion 122.

For example, in the case where the hinge fixing portion 33, the wall portion 51, and the reinforcing member 52 overlap with each other, the thickness of the corresponding overlap portion is larger than those of other areas. However, since the wall portion 51 is provided in the functional component placement portion 122 so as to have a concave shape, an area where the wall portion 51 is interposed between the hinge fixing portion 33 and the reinforcing member 52 is inserted into the case, thereby thinning the thickness of the case.

As shown in FIG. 1, in the embodiment, there is provided a functional component cover 124 which covers the functional component placement portion 122 and is attached to the body cover 22. The functional component cover 124 includes a main unit 1241 which covers the functional component placement portion 122, a hinge cover portion 1242 which covers a part of the hinge rotation portion 31, and a keyboard cover portion 1243 which covers a part of the keyboard 11. The keyboard cover portion 1243 fixes the keyboard 11 to the body cover 22 by interposing the end of the keyboard 11 between the body cover 22 and the keyboard cover portion.

With such a configuration, the functional component cover 124 according to the embodiment has a protection function of the hinge portion and an installing function of the keyboard 11 covering a part of the keyboard 11 in addition to a protection function of covering the functional component placement portion 122. Accordingly, it is possible to realize a decrease in the number of components, and to improve the assembling efficiency. In addition, since it is possible to cover a plurality of component areas by one cover, it is possible to improve the external decoration.

Figure 9:
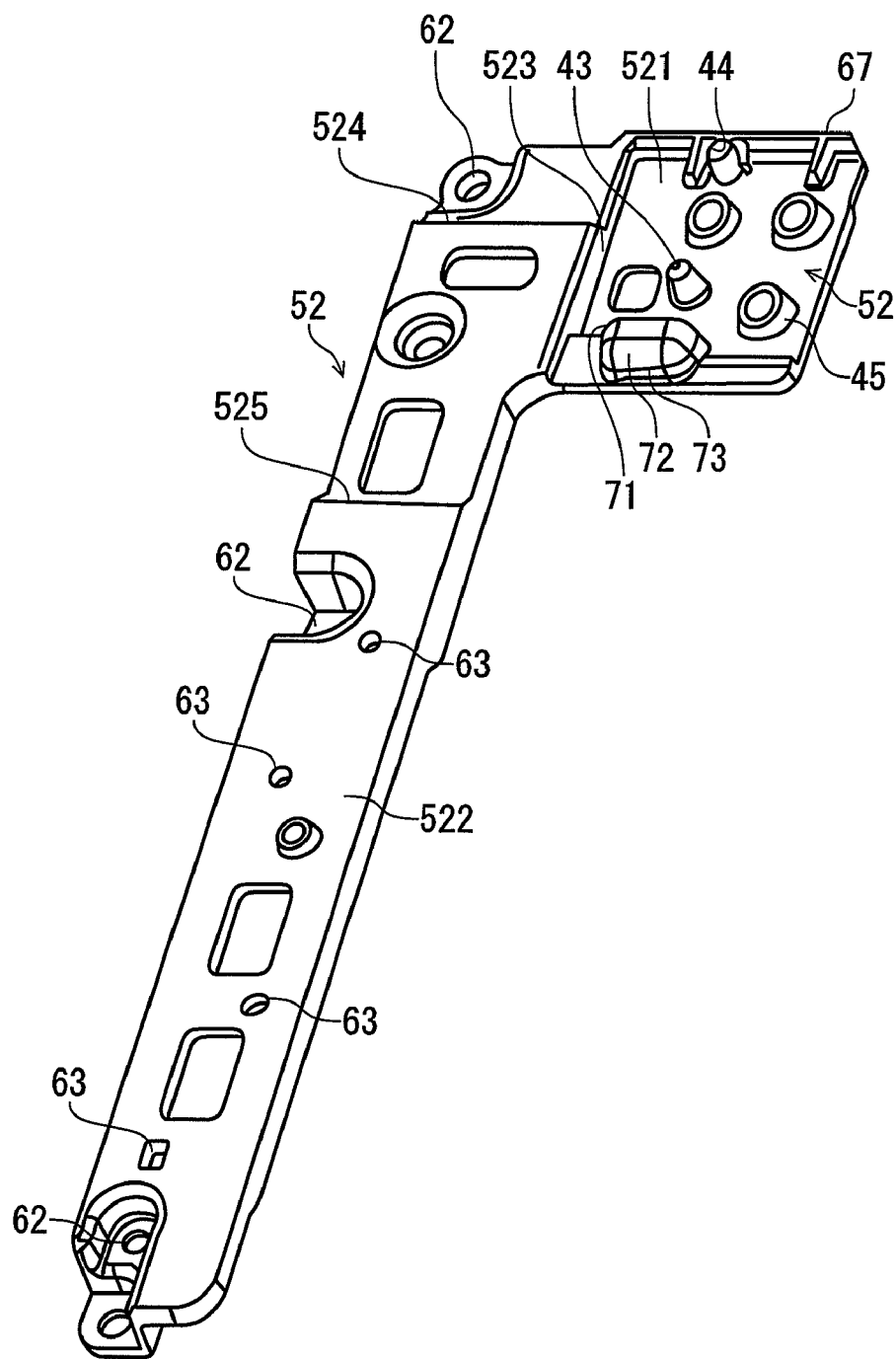
FIG. 9 is a perspective view showing a part of a reinforcing member shown in FIG. 6.

As shown in FIGS. 7 and 9, the reinforcing member 52 is attached to the inner surface (rear surface) of the body cover 22. The reinforcing member 52 is provided in, for example, the left and right ends of the body cover 22. The reinforcing member 52 is a member corresponding to the hinge bracket (a so-called hinge lower) of the main unit 2. However, the reinforcing member 52 according to the embodiment is formed to be divided by the hinge rotation portion 31, and to have a size, shape, and function different from those of the existing product. The reinforcing member 52 is, for example, a die-cast product of aluminum.

The reinforcing member 52 has a comparatively large width and thickness, and extends in an L-shape so as to be connected from the lower portion of the installation portion 40 to the side portion of the keyboard placement portion 12. That is, the reinforcing member 52 includes a first portion 521 which extends along the rear end 18 of the body cover 22, and a second portion 522 which extends along the left and right side walls as a part of the peripheral wall 9. The second portion 522 is designed to have a dimension longer than that of the first portion 521. The second portion 522 is attached to the inner surface of the body cover 22 at a plurality of positions. Accordingly, it is possible to reduce a stress transmitted from the first portion 521 to the body cover 22. The reinforcing member 52 includes stepped portions 523 to 525 which correspond to a plurality of concave portions or openings provided in the body cover 22. By using the stepped portions 523 to 525, it is possible to allow the reinforcing member to come into close contact with the body cover 22 and to protect the concave portion or opening where a load is easily applied and a variation in thickness easily occurs, or the peripheral area thereof.

The reinforcing member 52 is fixed to the body cover 22 by using a plurality of weld-fixing portions 63 and a screw fixing portion 62 used for a positioning operation or a temporary fixing operation. In addition, the weld-fixing portion 63 is formed in such a manner that a protrusion made from a synthetic resin and provided in the body cover 22 passes through a through hole of the reinforcing member 52, and the front end of the protrusion is heated and pressurized to be deformed. In the embodiment, for example, when one screw fixing portion 62 is fixed by a screw 64, the positioning operation and the temporary fixing operation of the reinforcing member 52 are performed. Accordingly, the plurality of weld-fixing portions 63 (for example, three or more positions) divided in the longitudinal direction of the reinforcing member 52 is weld-fixed, thereby fixing the reinforcing member 52 to the body cover 22. The reinforcing member 52 is firmly fixed to the body cover 22 as if the reinforcing member 52 is integrated with the body cover 22 so as to reinforce the body cover 22.

Figure 10:
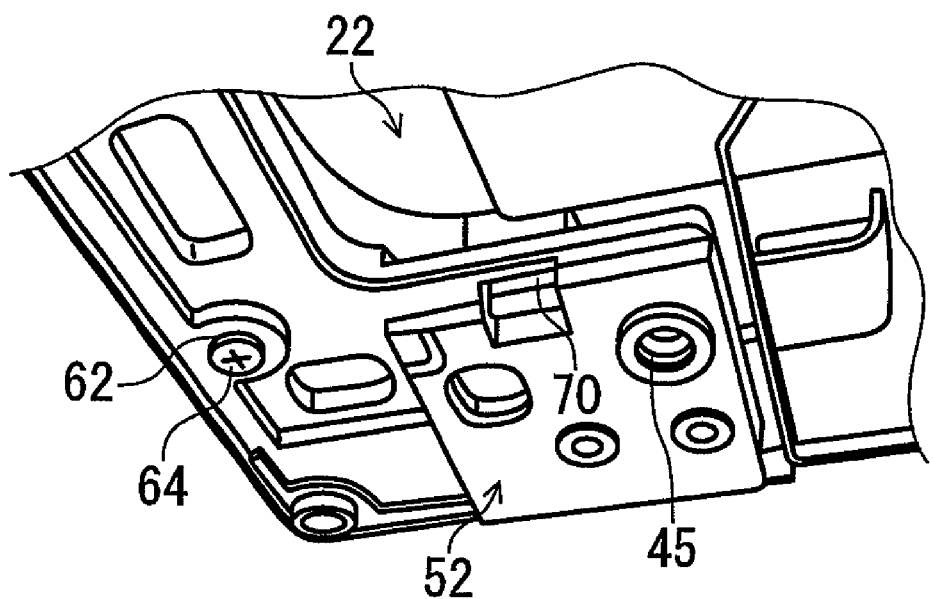
FIG. 10 is a perspective view showing a part of the reinforcing member shown in FIG. 6.

As shown in FIGS. 10 and 11, the reinforcing member 52 overlaps with the lower portion of the wall portion 51 of the body case 6 so as to form a part of the installation portion 40. The reinforcing member 52 includes a support portion 66 and a convex portion 67. The support portion 66 overlaps with the wall portion 51 of the body case 6 so as to support the lower portion of the wall portion 51. As shown in FIG. 3, the convex portion 67 is provided in an area where the wall portion 51 deviates from the installation portion 40, that is, an area where the wall portion 51 does not exist. The convex portion 67 protrudes more than the support portion 66, and is located at a surface flushed with the upper surface of the horizontal wall portion 54 of the wall portion 51. The convex portion 67 forms a part of the placement surface 41. That is, the main unit 35 of the hinge fixing portion 33 is also placed on the convex portion 67. The convex portion 67 supports the lower portion of the hinge fixing portion 33.

As shown in FIGS. 6 and 11, the receiving portion 42, the first and second pins 43 and 44, the through hole 45, and the first and second screw holes 46 and 47 are provided in the reinforcing member 52, and are respectively made from metal. The receiving portion 42 includes an insertion opening 70 which is provided between the placement surface 41 and the receiving portion so as to allow the insertion portion 37 of the hinge fixing portion 33 to be inserted thereinto. The receiving portion 42 is deviated above the placement surface 41 and is provided in front of the placement surface 41. The receiving portion 42 is formed as a bowl shape of which the lower portion and the rear portion are opened.

The receiving portion 42 includes a ceiling portion 71, a deep portion 72, and left and right side portions 73 and 74. The ceiling portion 71 is widened in the horizontal direction. The lower surface of the ceiling portion 71 includes a receiving surface 75 which is widened in the horizontal direction so as to be parallel to the placement surface 41. A gap between the receiving surface 75 and the placement surface 41 is equal to the thickness of the insertion portion 37 or the main unit 35. Accordingly, when the main unit 35 is parallel to the placement surface 41, a gap between the insertion portion 37 and the receiving surface 75 becomes zero.

The deep portion 72 extends downward from the end of the ceiling portion 71. The left and right side portions 73 and 74 extend downward from the left and right side portions of the ceiling portion 71. That is, an area surrounded by the placement surface 41, the receiving surface 75, and the left and right side portions 73 and 74 forms the insertion opening 70. A gap between the left and right side portions 73 and 74 is set to be much larger than the width of the insertion portion 37. The position of the insertion portion 37 is adjustable in the left/right direction of the receiving portion 42.

As shown in FIG. 11, the lower portion of the receiving portion 42 is not provided with the wall portion 51 and the reinforcing member 52, but is opened to the inside of the body case 6. As shown in FIG. 12, the lower portion of the receiving portion 42 is provided with a space S passing by (that is, avoiding) the insertion portion 37 obliquely inserted into the insertion opening 70.

As shown in FIGS. 6 and 11, the first and second pins 43 and 44 protrude upward from the placement surface 41. The first pin 43 protrudes to the upper position of the placement surface 41 through the through hole 56 of the wall portion 51. The second pin 44 is provided in an area deviating from the wall portion 51 and protrudes to the upper position of the placement surface 41. Both first and second pins 43 and 44 are positioning pins for determining the position of the hinge fixing portion 33. For example, the first and second pins 43 and 44 are formed so that the upper portion is formed as a conical shape.

The second pin 44 is located in the rear of the first pin 43 in the insertion direction (a direction from the rear wall 14 to the front wall 13) of the insertion portion 37. That is, the receiving portion 42, the first pin 43, and the second pin 44 are sequentially arranged from the front side of the insertion direction.

As shown in FIG. 6, the through hole 45 and the first and second screw holes 46 and 47 are opened to the placement surface 41. In detail, the through hole 45 and the first and second screw holes 46 and 47 are provided in the reinforcing member 52, and are exposed to the outside of the installation portion 40 through the through holes 57, 58, and 59 of the wall portion 51.

The layout of the through hole 45 and the screw holes 46 and 47 is not particularly limited. In the embodiment, for example, the second screw hole 47 is designed between the first and second pins 43 and 44. In addition, the through hole 45 and the screw holes 46 and 47 may be provided in front or rear of the first and second pins 43 and 44. The through hole 45 is continuous to a screw hole (not shown in the drawing) of a POS provided in the body base 21.

As shown in FIGS. 2 and 13, the main unit 35 of the hinge fixing portion 33 is placed on the placement surface 41 of the installation portion 40. The lower portion of the main unit 35 is supported by the placement surface 41. The insertion portion 37 is inserted into the insertion opening 70, and comes into contact with the lower portion of the receiving surface 75. The insertion portion 37 is supported by the receiving portion 42 from the opposite side (that is, from the upside) of the placement surface 41. Accordingly, the first hinge 4 connected to the display unit 3 does not fall down to the rear side even before the screw-fixing operation.

As shown in FIG. 3, the main unit 35 includes an oval hole 81, a circular hole 82, and first to third insertion holes 83, 84, and 85. The oval hole 81 is provided at a position corresponding to the first pin 43, and engages with the first pin 43. The oval hole 81 has a longitudinal direction in the insertion direction (that is, the front/rear direction) of the insertion portion 37. When the oval hole 81 engages with the first pin 43, the position of the hinge fixing portion 33 in the front/rear direction is adjustable, and the movement in a direction (that is, the left/right direction) intersecting the insertion direction of the insertion portion 37 is regulated.

The circular hole 82 is provided at a position corresponding to the second hinge 44, and engages with the second hinge 44. The circular hole 82 has an inner diameter corresponding to the diameter of the second pin 44. When the circular hole 82 engages with the second pin 44, the movement of the hinge fixing portion 33 is regulated in the front/rear direction and the left/right direction.

The first to third insertion holes 83, 84, and 85 are provided at positions corresponding to the through hole 45 and the first and second screw holes 46 and 47, and communicate with the through hole 45 and the first and second screw holes 46 and 47. The first screw 87 is inserted through the first insertion hole 83 and the through hole 45, and engages with a screw hole (not shown in the drawing) of the body base 21. The first and second screws 88 and 89 are inserted through the second and third insertion holes 84 and 85, and engage with the first and second screw holes 46 and 47. Accordingly, the hinge fixing portion 33 is firmly fixed to the installation portion 40.

As shown in FIGS. 2 and 3, the hinge fixing portion 33 includes a pressing portion 91. The pressing portion 91 faces an upper portion of a cable 92 extending between the display unit 3 and the main unit 2, and suppresses the uplift of the cable 92.

Next, an operation of assembling the electronic device 1 will be described.

The reinforcing member 52 is fixed to the body cover 22 before the attachment of the first and second hinges 4 and 5. In detail, the positioning operation and the temporary fixing operation of the reinforcing member 52 with respect to the body cover 22 are performed in such a manner that the screw fixing portion 62 is fixed by the screw 64. In addition, the plurality of weld-fixing portions 63 is weld-fixed at one time by using a weld-fixing device. Accordingly, the reinforcing member 52 is firmly fixed to the body cover 22.

Meanwhile, when the hinge bracket 32 is fixed to the display unit 3, the hinge rotation portion 31 or the hinge fixing portion 33 is connected to the display unit 3. In addition, when the hinge fixing portion 33 is fixed to the installation portion 40, the display unit 3 is connected to the main unit 2.

In detail, as shown in FIG. 12, the insertion portion 37 is obliquely inserted into the insertion opening 70 from the upside. In addition, the hinge fixing portion 33 is rotated downward about the inserted insertion portion 37 as a rotation support point so that the main unit 35 is parallel to the placement surface 41 (in FIG. 12, the movement of the arrow A).

During this movement, first, the oval hole 81 engages with the first pin 43, so that the temporary positioning operation of the hinge fixing portion 33 is performed in the left/right direction.

Subsequently, the circular hole 82 engages with the second pin 44, so that the positioning operation of the hinge fixing portion 33 is performed in the front/rear direction and the left/right direction. At this time, the insertion portion 37 comes into contact with the receiving surface 75 at the same time when the main unit 35 is placed on the placement surface 41, so that the upper portion of the insertion portion 37 is supported by the receiving portion 42.

As shown in FIG. 13, a moment M that the display unit 3 falls down to the rear side acts on the hinge fixing portion 33 due to the weight of the display unit 3. However, since the upper portion of the insertion portion 37 is supported by the receiving portion 42 at the same time when the main unit 35 comes into contact with the placement surface 41, the display unit 3 does not fall down. That is, the installation portion 40 supports the display unit 3 so as not to fall down without using a screw.

For example, an assembling operator engages the first screw 87 with the screw hole of the body base 21 through the insertion hole 83 and the through hole 45 in the state where the display unit 3 is not touched by either hand. Further, the operator engages the second and third screws 88 and 89 with the screw holes 46 and 47 through the insertion holes 84 and 85. Accordingly, the hinge fixing portion 33 is fixed to the installation portion 40. Subsequently, a hinge cover 94 is attached to the main unit 2.

With such a configuration, it is possible to improve the assembling efficiency of the electronic device 1. That is, since there is provided the insertion portion 37 inserted to the insertion opening 70 and supported by the receiving portion 42 from the opposite side of the placement surface 41, it is possible to support the display unit 3 so as not to fall down in the state where a screw is not fixed. For this reason, the assembling operator is able to perform an operation of fastening the screw without touching the display unit 3 using both hands. Accordingly, it is possible to remarkably improve the assembling efficiency of the electronic device 1. Further, since the first and second pins 43 and 44 are positioned to the oval hole 81 and the circular hole 82, it is possible to further improve the assembling efficiency of the electronic device 1.

Further, with such a configuration, it is possible to perform the assembling operation in consideration of an error of each component. That is, each of the body cover, the hinge, and the display unit has an assembling error (assembling tolerance) or a dimension error (component tolerance) in the manufacture. Here, for comparison, an electronic device may be supposed in which the first hinge bracket extending to the inside of the display unit, the second hinge bracket extending to the inside of the main unit, and the hinge rotation portion are integrated as a hinge assembly.

In this case, first, the hinge assembly has dimension errors of the first and second hinge brackets and the hinge rotation portion. Further, when the hinge assembly is assembled, the assembling error is included. Then, when the hinge assembly is connected to the display unit, the dimension error of the hinge assembly and the dimension error of the display unit are added, and the assembling error is included, so that large errors are included.

Further, the main unit may have some dimension error. For this reason, when the hinge assembly connected to the display unit is connected to the main unit, the dimension errors of the display unit and the hinge assembly and the dimension error of the main unit are added, and the assembling error is included in accordance with the connection, so that the electronic device has large errors.

In addition, the hinge assembly is compulsorily fixed to the main unit so as to enclose the added errors. For this reason, there is a case that a stress exists in the fixing portion for fixing the hinge assembly. If a stress exists in the fixing portion, when the display unit is repeatedly opened or closed, the possibility of breaking the fixing portion of the hinge increases.

Meanwhile, in the configuration according to the embodiment, the dimension errors of the display unit 3 and the hinge bracket 32 and the assembling error (hereinafter, the error of the display unit 3) exist between the display unit 3 and the hinges 4 and 5. In addition, the dimension errors and the assembling errors (hereinafter, the errors of the main unit 2) of the body cover 22 and the reinforcing member 52 exist between the body cover 22 and the reinforcing member 52.

However, in the configuration according to the embodiment, one of two positioning holes is the circular hole 82 and the other thereof is the oval hole 81. For this reason, since the second pin 44 engaging with the circular hole 82 is set to a positioning reference, and the first pin 43 engages with the oval hole 81 without any difficulty at the position where the error in the front/rear direction is considered, the error in the front/rear direction which can be enclosed by the hinge fixing portion 33 is alleviated.

Further, the error in the left/right direction can be alleviated by rotating the hinge fixing portion 33 on the placement surface 41 in the left/right direction and using the shape of the oval hole 81. That is, in the state before the circular hole 82 engages with the second pin 44, the hinge fixing portion 33 is slightly inclined in the left/right direction, and the position of the hinge fixing portion 33 with respect to the first pin 43 is adjusted along the shape of the oval hole 81. Accordingly, it is possible to adjust the position of the oval hole 82 with respect to the second pin 44 without applying a load from the oval hole 81 to the first pin 43. Therefore, since it is possible to engage the circular hole 82 with the second pin 44 without any difficulty, it is possible to alleviate the error in the left/right direction which can be enclosed by the hinge fixing portion 33.

That is, in the embodiment, it is possible to absorb the error of the display unit 3 and the error of the main unit 2 between the hinge fixing portion 33 and the installation portion 40. For this reason, the error enclosed by the hinge fixing portion 33 becomes small. As a result, a stress hardly exists in the hinge fixing portion 33, and the reliability of the electronic device 1 is improved.

When the oval hole 81 has a longitudinal direction in the insertion direction of the insertion portion 37, as shown in FIG. 12, when the hinge fixing portion 33 taking an oblique posture is rotated toward the placement surface 41, the oval hole hardly comes into contact with the first pin 43 compared with the circular hole. For this reason, it is possible to perform the smooth attachment of the hinge fixing portion 33.

When the receiving portion 42 is provided to be deviated from the upper portion of the placement surface 41, and the space S is provided below the receiving portion 42 for the insertion portion 37, the insertion portion 37 is inserted into the insertion opening 70 in an oblique posture, and the hinge fixing portion 33 can be rotated toward the placement surface 41 after the insertion operation. Accordingly, it is possible to improve the attachability of the hinge fixing portion 33.

If the front ends of the first and second pins 43 and 44 are formed as a conical shape, when the hinge fixing portion 33 taking an oblique posture is rotated toward the placement surface 41, the hinge fixing portion 33 hardly comes into contact with the first and second pins 43 and 44. For this reason, it is possible to improve the attachability of the hinge fixing portion 33.

The receiving portion 42 may be provided in the body case 6 made from a synthetic resin. In addition, when the receiving portion 42 is provided in the metallic reinforcing member 52, the receiving portion 42 applied with a comparatively large force or moment can be comparatively decreased in size while maintaining the strength thereof. Accordingly, it is possible to contribute to a decrease in size and a decrease in thickness of the electronic device 1.

The screw holes 46 and 47 may be provided in the body case 6 made from a synthetic resin. In addition, when the screw holes 46 and 47 are provided in the metallic reinforcing member, it is possible to easily ensure the strength of the screw holes 46 and 47 applied with a comparatively large force.

The second pin 44 is not an essential component. In addition, when the second pin 44 engaging with the circular hole 82 is provided, it is possible to more accurately perform the positioning operation of the hinge fixing portion 33 compared with the case where only the first pin 43 engaging with the oval hole 81 is provided.

If the second pin 44 is located in the rear of the first pin 43 in the insertion direction of the insertion portion 37, during the rotation for the attachment of the hinge fixing portion 33, it is possible to allow the oval hole 81 to correspond to the first pin 43 engaging at a comparatively steep angle, and to allow the circular hole 82 to correspond to the second pin 44 engaging at a comparatively gentle angle. For this reason, it is possible to smoothly engage the circular hole 82 with the second pin 44.

When the body case 6 forms at least a part of the placement surface 41, and has the wall portion 51 interposed between the reinforcing member 52 and the main unit 35, the body case 6 is reinforced by the wall portion 51. For this reason, it is not necessary to provide an additional reinforcing portion in the body case 6. When the reinforcing member 52 includes the support portion 66 which supports the lower portion of the wall portion 51 and the convex portion 67 which forms a part of the placement surface 41 protruding more than the support portion 66, the convex portion 67 serves as a pillar, and hence it is possible to increase the strength of the reinforcing member 52.

Here, for comparison, an electronic device may be supposed in which a hinge bracket as a part of a hinge assembly is attached to the main unit. In the electronic device, the hinge bracket connected to the display unit 3 is inserted and fixed to the opening of the body case. For this reason, it may be difficult to weld-fix the hinge bracket due to the interference of the display unit during the weld-fixing operation. Further, the size or shape of the hinge bracket is limited due to the limitation of the size of the opening of the body case.

Meanwhile, in the configuration of the embodiment, the first and second hinges 4 and 5 are adapted to be detached from the main unit 2. For this reason, it is possible to fix the reinforcing member 52 to the inner surface of the body cover 22 in a manner independent from the operation of attaching the first and second hinges 4 and 5. For this reason, it is possible to weld-fix the reinforcing member 52, but it may be difficult to limit the size or shape thereof. As for the weld-fixing operation, it is possible to easily reduce the cost or the number of processes compared with the screw-fixing operation.

Second Embodiment

Next, the electronic device 1 according to a second embodiment of the invention will be described with reference to FIG. 14. The same reference numerals will be given to components substantially identical or similar to those of the first embodiment, and the description thereof will be omitted. Further, the configuration to be described below is the same as that of the first embodiment.

The electronic device 1 according to the embodiment includes a comparatively large keyboard 11 including numeric keys. For this reason, as shown in FIG. 14, the electronic device 1 includes the keyboard placement portion 12 which is provided in an area substantially equal to the entire width of the body cover 22. The reinforcing member 52 is formed to be smaller than the first embodiment, and is provided in an area in the rear of the keyboard placement portion 12.

A reinforcing sheet metal member 101 is connected to the reinforcing member 52. The keyboard placement portion 12 is formed to be concave inward to the body case 6. The sheet metal member 101 is formed to be thinner than the reinforcing member 52 so as to correspond to the concave degree of the keyboard placement portion 12. The sheet metal member 101 is attached to the lower portion of the keyboard placement portion 12 along the side end of the body cover 22. The sheet metal member 101 reinforces the keyboard placement portion 12.

With such a configuration, it is possible to improve the assembling efficiency of the electronic device 1 as in the first embodiment. With the above-described configuration, in the electronic device 1 according to the embodiment and the electronic device 1 according to the first embodiment, the reinforcing member 52 and the body cover 22 have different shapes, but the other components may be commonly used. According to the electronic device 1, it is possible to comparatively simply satisfy a customized request such as the type of the keyboard 11.

Although the embodiments according to the present invention have been described above, the present invention is not limited to the above-mentioned embodiments but can be variously modified. Constituent components disclosed in the aforementioned embodiments may be combined suitably to form various modifications. For example, some of all constituent components disclosed in the embodiments may be removed or may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising:
  a key input module configured to receive an external input;
  a functional component;
  a first unit comprising a first opening that is provided with the key input module and a second opening that is provided near the first opening and comprises a bottom wall portion on which the functional component is placed;
  a first bracket being accommodated in the first unit and including a facing surface that faces the bottom wall portion;
  a display unit configured to accommodate a display device comprising a display screen; and
  a hinge comprising a second bracket that is accommodated in the display unit and connected to the facing surface with the bottom wall portion interposed therebetween.

2. The device of claim 1,
  wherein the second bracket comprises a connection surface that faces the bottom wall portion and connected to the facing surface, and
  wherein the connection surface comprises an area that is smaller than that of the facing surface of the first bracket.

3. The device of claim 2 further comprising:
  a cover being provided at the second opening to cover the functional component, the hinge, and a part of the key input module.

4. The device of claim 3,
wherein the bottom wall portion comprises a placement surface on which the functional component is placed and a concave portion that is located closer to the inside of the first unit than the placement surface and faces the facing surface of the first bracket.

5. The device of claim 4,
wherein the second bracket is provided with a through hole, and
wherein the facing surface of the first bracket is provided with a protrusion that passes through the bottom wall portion and the through hole of the second bracket.

6. The device of claim 5,
wherein the through hole of the second bracket and the protrusion of the first bracket are provided in plural and are arranged in a direction from a rotation portion of the hinge to the key input module.

7. An electronic device comprising:
a first unit comprising a wall portion;
a second unit;
a bracket being accommodated in the first unit and comprising a facing portion that faces the wall portion; and
a hinge being connected to the second unit and comprising a fixing portion that is fixed to the facing portion with the wall portion interposed therebetween.

8. The device of claim 7,
wherein the facing portion is configured to face the wall portion by an area that is wider than that of the fixing portion.

9. The device of claim 8,
wherein the bottom wall portion comprises a concave portion, and
wherein the facing portion is partially accommodated in the concave portion.

* * * * *